July 7, 1936.  L. PREISMAN  2,046,842
MANUFACTURE OF PHOSPHATES
Filed July 29, 1933  2 Sheets-Sheet 1
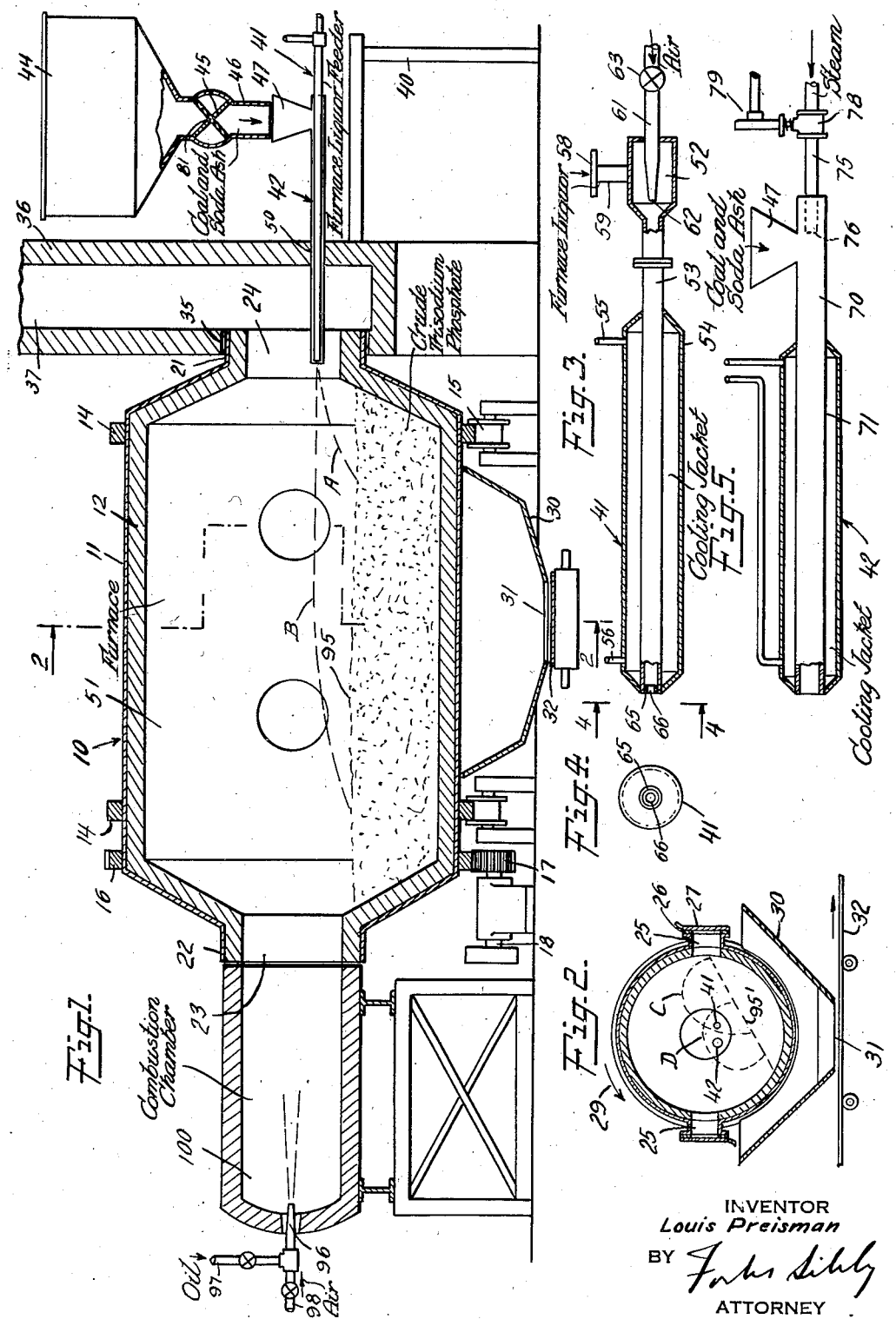
INVENTOR
Louis Preisman
BY
ATTORNEY July 7, 1936.  L. PREISMAN  2,046,842

MANUFACTURE OF PHOSPHATES

Filed July 29, 1933  2 Sheets-Sheet 2

Fig. 6.

```
                          H2SO4
                            │
                            ▼
                       H3PO4 Plant ◄── Phosphate Rock
                            │        91
   Rock      Salt Cake      │
   Salt      or Nitre Cake  │
     │         │            ▼
     │         └──► Furnace Liquor
     │              Mix Tank
     │                  │  92
   Coal    Soda Ash     │
     │       │          ▼
     └───────┴───► Furnace
                      │ 10
                      ▼
              Furnace Product
                 Dissolver
                      │ 101
   Zinc Oxide         │
       │              ▼
       └────────► Batch Tank
                      │ 102
            103       ▼
   T.S.P. Liquor ◄── Filter ──► Red Mud
```

Fig. 7.

```
                                    T.S.P. Mother Liquor from T.S.P. Crystal Plant
                                                    │
   White Mud from D.S.P. Filter                     │
            │                    120                │
            │              130    │           Phosphate
            ▼               │     │          Rock Digest       135
       White Mud       Sulfuric  Trisodium      │         Salt Cake
            │           Acid     Phosphate     Crude      Rock Salt or
            │            │     Mother Liquor  Phosphoric  Nitre Cake
            ▼            │        │            Acid         │
       White Mud  132    │        │ 129         │           │
        Paddler ──┐      └───┐    ▼             │           │
            │     │          └►Mix Tank         │           │
   Coal     │     │               │             │           │
   Soda Ash │     │  Digest Liquor│   Calcium Sulfate Mud   │
     │ │    │     └──────────►Digest──────────────────────  │
     ▼ ▼    ▼                     │ 133
    Furnace                       
        │
        ▼
    Furnace
    Product ──►
   Dissolver
```

INVENTOR
*Louis Preisman*
BY
ATTORNEY

Patented July 7, 1936

2,046,842

UNITED STATES PATENT OFFICE 2,046,842

MANUFACTURE OF PHOSPHATES

Louis Preisman, Wilmington, Del., assignor to General Chemical Company, New York, N. Y., a corporation of New York Application July 29, 1933, Serial No. 682,802

16 Claims. (Cl. 23—106)

This invention relates to the manufacture of alkali metal phosphates, and more particularly to processes for producing di- and/or trialkali metal phosphates. Although directed to the production of alkali metal phosphates generally, for convenience, the process constituting the invention will be described in connection with the making of sodium phosphates.

Alkali phosphates have heretofore been produced by methods such as those described in U. S. Patents Nos. 744,128, November 17, 1903, and 1,037,837, September 3, 1912, to Strickler. In the process of the former patent, phosphate containing material, such as ordinary phosphate rock (calcium phosphate), is digested in a water solution of nitre cake ($NaHSO_4$). According to Patent 1,037,837, phosphate rock may be digested with sulfuric acid, and, after the removal of the precipitated calcium sulfate, salt cake ($Na_2SO_4$) is added to the phosphoric acid solution. In the processes of both patents, the solutions of crude phosphoric acid and sodium salts of sulfuric acid thus obtained are furnaced with carbonaceous material to produce trisodium phosphate.

The Lohmann U. S. Patent No. 1,727,551, September 10, 1929, describes a modified procedure, relating to the Strickler processes, according to which procedure by utilization of a preferred ratio of sodium sulfate to phosphoric acid in the furnace mix, a furnaced material having desirable physical properties, and a higher yield and degree of purity of phosphate products are obtained. Further improvements involving principles of the Strickler patents are described in Levermore U. S. Patent No. 1,866,657, July 12, 1932. The Levermore patent describes the digestion of phosphate rock in sulfuric acid, and separation of precipitated calcium sulfate. The crude phosphoric acid solution is then neutralized to produce sodium phosphate liquor and a precipitate known in the art and referred to herein as "white mud". On separation of liquor and white mud, the latter is incorporated as a principal constituent of a mix furnaced with carbonaceous material by the process of the Strickler patents. The white mud produced in the neutralization stage of the process of the Levermore patent contains principally phosphates of sodium, calcium, iron and aluminum, and sodium fluosilicate ($Na_2SiF_6$).

In the operation of the Strickler and Lohmann processes, whether in accordance with these patents alone or when performed in conjunction with the process of the Levermore patent, i. e. utilizing white mud produced by the Levermore process as part of the furnace mix, the ultimate product obtained, after dissolving furnace material in water and subsequent concentration and crystallization, is trisodium phosphate. Mother liquor resulting from crystallization contains quantities of trisodium phosphate ($Na_3PO_4$), sodium hydroxide (NaOH), sodium sulfate ($Na_2SO_4$), and sodium carbonate ($Na_2CO_3$).

The furnacing operation of the prior art is described in detail in the Strickler and Lohmann patents. Reactions involved are complicated, and are set forth as understood in Strickler Patent 744,128 and in the Lohmann patent. In the prior practice, after charging the sodium sulfate-phosphoric acid liquor into the furnace, the subsequent reaction involves five phases: (1) the charge is heated by direct reducing flame until the liquor dries; (2) heating is continued until the solid mix fuses; (3) heating is continued with the reducing flame until the charge commences to foam, this indicating the beginning of the reduction of sodium sulfate to sulfide; (4) carbonaceous fuel is then added in small charges until the furnace mix becomes granular and shows only a few percent of sodium sulfate; (5) when the latter stage is reached, the heating flame may be made oxidizing by an increased supply of air, to aid in whitening the charge. Because of the evident complicated nature of the reactions and the various physical changes through which the materials involved pass, the process has always been operated on a batch basis, and previous attempts to increase production of a given unit of apparatus have been unsuccessful.

The process of the present invention includes furnacing, in a continuous manner, a mixture of sodium salts of sulfuric acid and crude phosphoric acid with carbonaceous material to produce crude trisodium phosphate. The principal objects of the invention are the provision of improvements relating to the production of crude trisodium phosphate in a continuous furnacing operation, such improvements particularly involving the use of sodium carbonate in connection with furnacing by means of which furnace products of particular characteristics are obtained. Although the use of sodium carbonate in connection with production of crude trisodium phosphate has been previously suggested, I have found that sodium carbonate may be advantageously utilized in connection with continuous furnacing.

Generally speaking, in the manufacture of commercial trisodium phosphate from crude trisodium phosphate, according to the prior practice, considerable amounts of caustic soda have been employed in the later stages of the process. The present process provides a method whereby in the production of commercial di- and/or trisodium phosphate from the crude furnace trisodium phosphate product, the use of caustic is avoided. Hence, other objects of the invention reside in the provision of a method by which economies may be effected in connection with the manufacture of phosphates in a continuous operation.

As noted, the furnace liquor mix comprises principally sodium sulfate and crude phosphoric acid. This mixture may be made up from raw materials such as salt cake ($Na_2SO_4$), nitre cake ($NaHSO_4$), rock salt ($NaCl$), crude phosphoric acid ($H_3PO_4$) and pure or impure sulfuric acid. The furnace product is crude trisodium phosphate, which may be dissolved in water or mother liquor and subsequently treated to produce trisodium phosphate or disodium phosphate. In the manufacture of trisodium phosphate, or in methods for making disodium phosphate for example by the process of the Levermore patent, there are produced substantial quantities of di- and trisodium phosphate mother liquors, and also the so-called white mud. These by-product substances contain sodium and $P_2O_5$ values which, when operating on a commercial scale, must be saved. To recover these values, furnace mixes may be made up containing for example disodium phosphate mother liquor and salt cake, or trisodium phosphate mother liquors, white mud, sulfuric acid, crude phosphoric acid, salt cake, nitre cake and rock salt.

The nature of the invention and additional objects and advantages thereof may be understood from a consideration of the following description taken in connection with the accompanying drawings, in which Fig. 1 is a vertical longitudinal section of the furnace;

Fig. 2 is a transverse vertical section, on reduced scale, on line 2—2 of Fig. 1;

Fig. 3 is an enlarged, longitudinal vertical section of a device for feeding liquor to the furnace;

Fig. 4 is an elevation taken approximately on the line 4—4 of Fig. 3;

Fig. 5 is a vertical longitudinal section of a device for feeding solid material into the furnace;

Fig. 6 is a flow sheet illustrating the operation of the process when using raw materials as sources of phosphates and sodium, and Fig. 7 is a flow sheet illustrating the procedure involved when utilizing by-product materials as sources of phosphates and sodium.

Referring to Fig. 1 of the drawings, 10 indicates a rotary furnace comprising a steel shell 11 having a lining of suitable refractory material 12. Fixed to shell 11 are tires 14 resting in supporting rollers 15. On one end of the shell is a gear 16, meshing with pinion 17, connected through a shaft 18 to a source of power for revolving the furnace.

The ends of the furnace shell are provided with short sections 21 and 22 forming gas inlet and outlet eyes 23 and 24. As shown in Figs. 1 and 2, the cylindrical section of the furnace has four discharge sleeves 25 the outer ends of which carry fixed plates 26 each of which is equipped with a gate 27 which covers an opening in plates 26. Gates 27 are slidably arranged on plates 26 so as to permit adjustment of the size of the openings in plates 26, in this manner making provision for regulation of the amount of material discharged through sleeves 25 on rotation of the furnace in the direction of the arrow 29 (Fig. 2).

Positioned beneath the shell so as to catch material discharged through sleeves 25 is a hopper 30 having an outlet 31 at the bottom through which material passes to a conveyor 32 (Fig. 2).

Cylindrical section 21 of the furnace projects into an opening 35 in the base of stack 36 forming a flue 37 through which gases and vapors from the furnace may be discharged from the apparatus.

Suitably mounted on framework 40 are a liquor feed device 41 and a solid material feeder 42, both shown diagrammatically in Fig. 1, and a supply bin 44 having in the bottom a star feeder 45 which charges material through conduit 46 into a hopper 47 at one end of feeder 42. As will be seen in Fig. 1 the liquor feed 41 and the solid material feeder 42 are positioned approximately in the same horizontal plane and pass through an opening 50 in the exit flue wall, extend through the flue and into the gas outlet eye 24, the ends of the feeders terminating just short of the reaction chamber 51 in the furnace 10.

Fig. 3 is an enlarged vertical section of the liquor feeder 41. The latter comprises principally a mixing chamber 52 and a cylindrical inlet conduit 53. That section of conduit 53 lying within the flue 37 and projecting into the furnace eye 24 is enclosed in a jacket 54 through which cooling liquid may be circulated by pipes 55 and 56. A liquor conduit from the furnace mix make-up tanks is connected by a coupling 58 with a short pipe section 59 through which liquor is introduced into the mixing chamber 52. An air pipe 61, having on the inner end a restricted nozzle 62, extends into the mixing chamber, the amount of air passing through pipe 61 being controlled by a valve 63. Set in the end of conduit 53 is a disc 65 having a circular opening 66.

Fig. 5 is an enlarged vertical section of a feeder 42 for charging solid material into the furnace. The feeder comprises principally a cylindrical conduit 70, the end extending through stack 37 and into eye 24 being provided with a jacket 71 for cooling liquid. Hopper 47, positioned beneath the outlet pipe 46 of bin 44, feeds solid material into the conduit 70. Steam pipe 75, extending into conduit 70 and terminating at 76 beneath the hopper 47, is connected to a source of steam not shown. The pipe also includes a control valve 78 connected through a suitable cam, shown diagrammatically at 79, with shaft 81 of the star feeder 45 of Fig. 1. The mechanism between shaft 81 and valve 78 is preferably such that when star feeder 45 is operated to feed material from bin 44 into hopper 47, valve 78 is synchronously opened to permit injection of such quantity of steam into conduit 70 as will carry the solid material fed into conduit 70 from bin 44, through the pipe 70 and into the furnace.

The process will be first described when using raw materials, and may be understood from a consideration of the following description taken in connection with the flow sheet of Fig. 6.

The crude phosphoric acid of acid plant 91 is employed in making up the furnace mix, and consequently may be a phosphoric acid containing appreciable quantities of impurities. As organic material and arsenic are eliminated from the mix during furnacing, the phosphate rock employed in making up the acid in plant 91 need not be previously calcined, and the sulfuric acid used for digesting the phosphate rock may be a relatively low-grade acid containing arsenic and other impurities, such as the acid recovered from the wet purification of sulfur dioxide gases in the manufacture of sulfuric acid by the contact process, such acid being commonly known in the art as dust chamber acid.

The furnace liquor mix formed in tank 92 may be made up of materials such as salt cake, nitre cake, or rock salt (NaCl) used separately or in any combination, together with crude phosphoric acid and sulfuric acid. The furnace liquor may be made up of various constituents the following being illustrative examples:

*Example 1*

|  | Pounds |
|---|---|
| Salt cake (96% $Na_2SO_4$–42% $Na_2O$) | 42000 |
| Dust chamber acid (62% $H_2SO_4$) | 6400 |
| Phosphoric acid (18% $P_2O_5$) | 80000 |

*Example 2*

|  | Pounds |
|---|---|
| Salt cake (96% $Na_2SO_4$–42% $Na_2O$) | 28100 |
| Rock salt (52% $Na_2O$) | 11300 |
| Dust chamber acid (62% $H_2SO_4$) | 6400 |
| Phosphoric acid (18% $P_2O_5$) | 80000 |

Whatever batch is employed using salt cake, nitre cake, or rock salt alone or any combination, the crude phosphoric acid and the sulfuric acid are preferably first fed into the mix tank 92. Solid materials are then added until the saturation point of the resulting solution is approximately reached. The remaining quantities of solid materials needed to make up the batch are preferably ground to pass 20–40 mesh for example, and added to the mix. If more than one sodium salt is used in forming the batch, it is preferred to add all of the more soluble salt and also some of the less soluble salt, if needed, to bring the solution to the saturation point, and then grind only the balance of the more insoluble salt. The resulting mass is a liquor containing solid material in suspension, and hence is preferably kept in a state of agitation to prevent settling.

The mix, comprising a thin slurry, formed in tank 92 in accordance with any of the above examples has a $Na_2SO_4$–$P_2O_5$ ratio of about 2.8:1. The liquor also contains an acidity equivalent to about 2–4% free sulfuric acid. In making up the batch, the quantity of sulfuric acid employed is preferably such as to provide in the resulting mix an acidity equivalent to about 2–4% free sulfuric acid to insure volatilization of HF and $SiF_4$ and consequent removal of these compounds from the mix in the subsequent furnacing operation.

In making up the mix in tank 92, the preferred ratio of $Na_2SO_4$ to $P_2O_5$, substantially within the limits of 2.75 to 2.85 of $Na_2SO_4$ to 1 of $P_2O_5$ is maintained as in the Lohmann patent. As described therein, the ratio is preferably within the above limits, or in other terms, the proportion of $Na_2SO_4$ should preferably be approximately 92 to 95% of that theoretically required to produce trisodium phosphate. If the $Na_2SO_4$–$P_2O_5$ ratio of the liquor in tank 92 is outside the limits noted, the ratio may be adjusted as needed by adding proper quantities of phosphoric acid or sodium salts. If sodium bisulfate is used, in forming the mix, the acid of the bisulfate is taken into account when providing for the above noted excess of sulfuric acid.

The furnace mix may be made up from any or all of rock salt, sodium sulfate and sodium bisulfate depending upon the available supply of these materials. When using sodium chloride, the amount employed is figured in terms of its equivalent of sodium sulfate.

Where sodium is supplied to the mix as rock salt (NaCl) in amounts less than one-third of the total soda required from the furnace mix, no further sulfuric acid need be added to the batch other than that necessary to provide for the acidity equivalent of about 2–4% free sulfuric acid. It is not desirable, however, to supply more than one third of the total sodium required in the furnace mix in the form of sodium chloride since that portion of the sodium chloride in excess of the one-third remains unreacted in the furnace, and accordingly makes necessary the addition to the furnace mix of sufficient sulfuric acid to convert the sodium of the unreacted sodium chloride to sodium sulfate and effect removal of chlorine from the furnace in the form of HCl. If under particular operating conditions, more than one-third of the sodium should be supplied to the furnace mix as sodium chloride, corresponding additional amounts of sulfuric acid are required to effect removal of chlorine in the furnace. As the combined cost of sodium chloride and sulfuric acid is now generally in excess of the cost of salt cake or sodium bisulfate, it is preferred to employ not more than one-third of the needed sodium as sodium chloride.

Crude trisodium phosphate furnace products of prior methods may consist for example of about 70% trisodium phosphate, 20% disodium phosphate in the form of phyrophosphate, and 10% insoluble matter. Approximately 10% of the total $P_2O_5$ and sodium input to the furnace are contained in this insoluble matter as a complex compound. By the present process, operating disadvantages inherent in prior procedures are overcome by the introduction of sodium carbonate into the furnace. Sodium carbonate is added to the furnace in amounts sufficient to convert the pyrophosphate to trisodium phosphate, to provide free caustic to break up the insoluble matter and release locked-in sodium and $P_2O_5$ values, and to provide about 2% free caustic to facilitate subsequent crystallization of trisodium phosphate, or a larger amount of free caustic, say 5%, in cases where a liquor having high causticity is desired. Generally, the soda ash added to the furnace is about 10–11% of the sodium finally included in the product. Of this amount of sodium carbonate, about 5% is utilized to convert the disodium phosphate (pyrophosphate) to trisodium phosphate, the remainder being utilized to provide free caustic in amount necessary to break up the insoluble matter, and to provide about 2% excess of caustic in the crystallization stage.

After the $Na_2SO_4$–$P_2O_5$ ratio of the liquor in the make-up tank 92 is adjusted, the liquor is then ready for furnacing. The liquor mix is continuously fed into the furnace, and in accordance with the preferred embodiment of the invention, a mixture of coal and soda ash may be continuously or intermittently charged into the furnace. For instance, a liquor mix made up in accordance with Example 1 or 2 may be fed into the furnace with not more than about 6000 lbs. of coal with which has been mixed about 3800 lbs. of soda ash. Thus, a mixture of coal passing through 10 mesh and soda ash in proper proportions is maintained in bin 44, and the inlet coupling 58 of the liquor injector 41 is connected to the furnace mix tank 92 (Fig. 6). The soda ash need not be admixed and fed into the furnace with the coal. The soda may be dampened and fed in by means of a separate injector.

In starting operations, the reaction chamber 51 is filled with a mass of crude trisodium phosphate furnace product from a previous operation. Lines 95 and 95', Figs. 1 and 2, indicate approximately the amount of crude trisodium phosphate product continuously maintained in the furnace. The quantities of air and oil admitted to burner 96 through oil line 97 and air inlet 98 are adjusted so that the fuel is substantially completely burned in combustion chamber 100, the combustion gases produced containing little or no oxygen entering reaction chamber 51 through gas inlet eye 23. Burner 96 is regulated so as to maintain temperatures in the reaction chamber not less than about 800° C. and preferably around 1000° C. The furnace is rotated in the direction of the arrow 29 (Fig. 2), and during the preliminary phases of operation slides 27 are closed. The liquor is injected into the furnace, through conduit 53 (Fig. 3) and opening 66, by a current of air introduced into the mixing chamber 52 by pipe 61. The quantity of air admitted to chamber 52 is regulated by valve 63 so that the liquor passes opening 66 in such manner that the drops of liquor are large enough to prevent being swept out of the furnace through gas outlet eye 24 by the waste combustion gases entering the base of stack 37. The liquor is sprayed onto the surface of the bed of material in the reaction chamber 51, the spray extending from about outlet eye 24 over approximately three-quarters of the length of the bed of solid material in the reaction chamber, for example, as indicated by the dotted lines A and B, Fig. 1. Owing to the relative position of liquor feeder 41, as seen in Fig. 2, it is believed the liquor spray falls on the upper portion of the bed of material in the furnace, for example, as within the area enclosed by dotted line 95' and the curved dotted line C, Fig. 2. When proceeding in accordance with the present example, the liquor may be injected into the reaction chamber at a rate of about 550 gallons per hour.

The mixture of coal and soda ash from bin 44 may be charged into the reaction chamber continuously or intermittently depending upon the particular type of feeder employed. Under some operating conditions, it may be inconvenient to provide mechanism for continuously feeding a relatively small amount of solid material into the furnace. In the present instance, it is preferred to inject the mixture of coal and soda ash intermittently at intervals ranging from about 1 to 3 minutes. Star feeder 45 is rotated from a suitable source of power at chosen intervals, to feed coal-soda ash mixture from bin 44 into the hopper 47. The shaft 81 of the star feeder may be connected by any suitable mechanical devices to the valve 78 in the steam line 75, and arranged so that on rotation of star feeder 45 the steam valve 78 is correspondingly opened to force material through conduit 70 into the reaction chamber 51, in other words valve 78 and feeder 45 are operated synchronously. In the present example, feeder 45 and valve 78 may be controlled so as to feed into the furnace approximately 325 lbs. per hour of the coal-soda ash mixture. The coal and soda ash seem to be distributed over the length of the charge in the furnace for example as approximately within the dotted lines A and B of Fig. 1. On account of the location of the feeder 42, as shown in Fig. 2, it is thought the mixture of coal and soda ash drops on the lower portion of the bed of material in the furnace for example within a cross-sectional area bounded by line 95' and curved line D, Fig. 2.

In place of the feeders 41 and 42, it will be understood any other suitable apparatus may be employed by means of which distribution of liquor, coal and soda ash may be obtained in a manner approximating that described above.

The exact nature of the reaction in the furnace between the several constituents is not known, although evidently the reactions are generally similar to those of the Strickler and Lohmann patents. It is believed, however, that crude trisodium phosphate is produced very rapidly, and that the reaction may be considered a flash reaction effected almost immediately on feeding the dispersion of reactant materials into the furnace and distributing the materials over the bed of material in the furnace. The bed of product in the furnace is always in a substantially dry condition. The product in the furnace adjacent the gas outlet eye 24 is the same as the product in the furnace adjacent the inlet eye 23, indicating that the reactions involved take place substantially immediately on introduction of the raw materials into the furnace.

The addition of soda ash to the charge in the furnace increases the total sodium present, and the above mentioned ratio of about 2.8:1 is raised to about 3.1:1. Notwithstanding this increased ratio, the advantages outlined in the Lohmann patent are apparently obtained in the present method, this result further indicating that furnacing is substantially a flash reaction.

When the process is under way, slides 27 are adjusted so as to permit discharge of regulated quantities of furnace product through outlets 25. Discharge of furnace product may be continuous or intermittent. If the former, slides 27 may be partially displaced to permit continuous discharge of the desired relatively small amounts of furnace product. In some instances, it may be found convenient to withdraw the slides to the full open position during a few revolutions of the furnace, and close the slides during a corresponding number of revolutions. This latter method overcomes clogging of openings in plates 26 which may take place where comparatively small amounts of furnace product are continuously withdrawn. As the furnace is operated at about a balance pressure, there is substantially no tendency for gas to escape through sleeves 25 when the latter are not covered by the bed of furnace product.

The amount of material thus discharged should be preferably such as to maintain in the shell a substantial body of furnace product, for example as indicated in Figs. 1 and 2 of the drawings. As shown in Figs. 1 and 2, the shell is provided with four such outlets, one pair being near eye 24. The material discharged from the reaction chamber through the outlets adjacent eye 24 is of the same nature as the product discharged through the outlets near eye 23, showing that the composition of the entire bed of material in the reaction chamber is substantially the same. The furnace product drops from hopper 30, and onto conveyor 32 which conducts the furnace product, usually while still hot, to a dissolver 101, Fig. 6.

The furnace product as introduced into the dissolver is a solid crude trisodium phosphate containing, for example, about 10% insoluble material comprising "red mud" constituents, 1–2% $Na_2SO_4$, 2% $Na_2O$, 0.5% $Na_2CO_3$, the balance comprising probably all trisodium phosphate. The mass is preferably boiled which hastens conversion of any pyrophosphate to orthophosphate and aids in separating $P_2O_5$ and sodium values from the red mud material. It is believed that the furnace product contains little if any pyrophosphate. If the latter is present in the furnace product, the pyrophosphate appears to be substantially immediately converted to the ortho form on introduction of the furnace product into the dissolver. On account of features involved in continuous furnacing, the crude furnace product contains smaller amounts of impurities than when the process is carried out on the batch basis. When furnacing by the batch method, control conditions cannot readily be maintained uniform. In the continuous method, conditions during furnacing are substantially uniform, and subject to better control. Hence, it is believed the more uniform control obtainable in the continuous process is responsible for the production of a furnace product containing relatively small amounts of impurities. For example, in the present method the amount of sodium sulfate present is not generally more than 1–2%. It is thus possible to produce phosphates low in sulfate.

From the dissolver the liquor flows into batch tank 102 in which the liquor may be treated with zinc oxide in quantities sufficient to effect precipitation as zinc sulfide of soluble sulfides contained in the liquor. The latter is run into a filter 103 in which the so-called red mud, comprising principally iron and aluminum oxides, coal ash and zinc sulfides, is separated from the liquor and discharged to waste.

When proceeding in accordance with the process of the present invention, by charging into the furnace with the liquor soda ash in amounts about equivalent to the caustic normally employed, a furnace product is obtained which after dissolving and boiling in the dissolver can be filtered once in filter 103 (Fig. 6) to remove the red mud, and provide a filtered solution comprising principally all trisodium phosphate. Whether the conversion of the pyrophosphate to trisodium phosphate and the decomposition of the above mentioned complex salt takes place in the furnace 10 or in the subsequent dissolving of the mass or in both is not definitely known. However, indications are that the reaction involved takes place in the furnace. Hence, the filtrate of filter 103 (Fig. 6) is a substantially all trisodium phosphate liquor, and containing about a 2% excess of free caustic which facilitates crystallization of trisodium phosphate. The latter may be recovered by crystallization in the usual way.

The operation of the process when employed to recover sodium and $P_2O_5$ values from white mud, such as produced in the method of the Levermore patent, and trisodium phosphate mother liquors, such as recovered from the trisodium phosphate crystallizers of the above process for making trisodium phosphate, may be understood from a consideration of the flow sheet of Fig. 7 of the drawings.

Part or the whole of the trisodium phosphate mother liquor from the crystallizer of the system of Fig. 6, the liquor containing principally trisodium phosphate, sodium hydroxide, sodium carbonate and sodium sulfate is run through line 120 into a mix tank 129 (Fig. 7), and the full amount of sulfuric acid, plus the 2–4% excess of acid above noted, needed for making up the final furnace mix is added thereto from a sulfuric acid tank 130. The total acid requirement is of course controlled by the amount of mother liquor and white mud going into the batch. The quantity of acid initially mixed with the mother liquor in mix tank 129 is sufficient to provide the entire amount of acid necessary to convert the sodium compounds of the mother liquor to sodium sulfate, and to transform the metal phosphates of white mud to phosphoric acid and the sodium fluosilicate of the white mud to sodium sulfate and hydrofluosilicic acid, and to provide the resulting mix an acidity equivalent to about 2–4% free sulfuric acid.

The reaction between the several constituents of the trisodium phosphate mother liquor and the sulfuric acid in mix tank 129 produces sodium sulfate and phosphoric acid with unreacted sulfuric acid remaining as such. After the reacted mother liquor and excess sulfuric acid are cooled, this mixture and a slurry of white mud from puddler 132, obtained for example from the process of the Levermore patent, and containing chiefly disodium phosphate, dicalcium phosphate, phosphates of iron and aluminum, precipitated calcium sulfate, and the above acidity equivalent to about 2–4% free sulfuric acid. The liquor in digester 133 is then ready for adjustment of the $Na_2SO_4$–$P_2O_5$ ratio in accordance with the Lohmann patent as above noted. Adjustment of the ratio may be effected in digester 133 either before or after the separation of the precipitated calcium sulfate from the liquor. Preferably, however, on completion of the digestion of the mother liquor, white mud and acid, the ratio adjustment is made, and then the calcium sulfate is permitted to settle out and is separated from the digest liquor in any suitable manner.

As this phase of the process is ordinarily practiced, around three-quarters to five-sixths of the amount of sodium required to make up the furnace mix in the digester 133 is furnished by the mother liquor and white mud. The deficiency of sodium in the digest liquor may be supplied by the addition thereto of sufficient quantities of salt cake, nitre cake, or rock salt from a source of supply 135 to bring up the sodium content of the digest liquor to the proper $Na_2SO_4$–$P_2O_5$ ratio. Where the sodium deficiency in the digest liquor is not more than one-third of the total amount required in the furnace mix, the deficiency in sodium may be made up solely by the addition of a desired quantity of sodium chloride, the amount of chloride being figured in terms of its equivalent of sodium sulfate. As pointed out above in connection with the operation of the process using raw materials, it is not desirable for the reasons noted, to supply more than one-third of the total sodium required in the furnace mix since that portion of the sodium chloride in excess of one-third remains unreacted in the furnace, makes necessary the addition to the furnace mix of sufficient sulfuric acid to convert the sodium of the unreacted sodium chloride to sodium sulfate and effect removal of the chlorine from the furnace as hydrochloric acid.

The digest liquor thus made up, preferably after concentration to about 40° Bé., and the proper proportions of coal and soda ash are fed into the furnace through injectors 41 and 42 (Fig. 1), and the furnacing operation is conducted substantially as described when operating the process using raw materials.

The process may be operated, substantially as follows, to recover by furnacing, sodium and P₂O₅ values from disodium phosphate mother liquor such as obtained from the process of the Levermore patent.

The disodium phosphate mother liquor is relatively pure, and because of the absence from the disodium phosphate mother liquor of impurities such as fluorine, the alkaline disodium phosphate mother liquor may be employed directly in making up a batch of furnace liquor without treating the disodium phosphate mother liquor with sulfuric acid, as would be done preferably if the disodium phosphate mother liquor, like the trisodium phosphate mother liquor, contained substantial amounts of impurities.

When refurnacing disodium phosphate mother liquor, the latter is run into a batch tank, and salt cake is added until the above noted preferred Na₂SO₄–P₂O₅ ratio is obtained. The resulting liquor may be concentrated if desired and continuously furnaced with coal and soda ash. When furnacing a batch of this nature, since impurities such as fluorine and silica are not included in the batch, acid need not be present during furnacing. It is not preferred to use nitre cake or sodium chloride in making up the batch, since the acid of the nitre cake would be wasted, serving no useful purpose in furnacing, and sulfuric acid would be required to convert the sodium chloride to sodium sulfate if sodium chloride were used.

When balancing the Na₂SO₄–P₂O₅ ratio of the disodium phosphate mother liquor batch with salt cake and producing crude trisodium phosphate by continuous furnacing, the soda ash may be fed into the furnace separately, or in admixture with the coal, and since there is no acid present in the disodium phosphate mother liquor, the soda ash also may be added to the liquor. The crude product made by furnacing a liquor comprising disodium phosphate mother liquor as a substantial constituent, because of the absence of any substantial amounts of impurities in the constituents of the batch, the furnace product contains a much smaller amount of insoluble material than is obtained when furnacing an acid liquor as previously described. Hence, a smaller amount of soda ash may be employed. Thus, when furnacing a liquor comprising principally disodium phosphate and salt cake the amount of soda ash employed is such as to convert the pyrophosphate to trisodium phosphate, and also to provide an excess of about 2% free caustic to facilitate subsequent crystallization of trisodium phosphate. Should the furnace product contain a small amount of insoluble material, sufficient soda ash should be used to break up the insoluble matter and release locked-in sodium and P₂O₅ values. In refurnacing disodium phosphate mother liquor, soda ash may be substituted for the salt cake in making up the furnace mix. This mix may include sufficient soda ash to react with the disodium phosphate to form trisodium phosphate, and in addition whatever soda ash may be needed to break up any insoluble matter and also to provide about 2% free caustic. In furnacing such a mix, coal need not be employed.

The liquor from the furnace product dissolver may be utilized for manufacture of trisodium phosphate as above described. This phase of the process of the invention may be employed to advantage where it is desired to produce relatively large amounts of disodium phosphate.

In the appended claims, the term "continuous" is intended to indicate a substantially uniform feed of reacting materials over a substantial period of time as distinguished from a batch operation, but it should be understood the feed need not be in an unbroken stream.

I claim:

1. In the process for the production of alkali metal phosphate involving furnacing a mix containing alkali metal sulfate and phosphoric acid, the steps comprising forming an alkali metal sulfate-phosphoric acid containing liquor, maintaining in the furnacing zone a relatively dry body of alkali metal phosphate furnace product, tumbling the body of furnace product, continuously distributing liquor over a major portion of said body, separately distributing a mixture containing carbonaceous material and alkali metal carbonate over a major portion of the body, furnacing the liquor with carbonaceous material to produce alkali metal phosphate under conditions such as to maintain the resulting body of material in a relatively dry condition, and withdrawing from the furnacing zone a portion of the body of furnace product.

2. In the process for the production of alkali metal phosphate involving furnacing alkali metal sulfate and phosphoric acid, the steps comprising forming an alkali metal sulfate-phosphoric acid containing liquor, maintaining in the furnace zone a relatively dry body of alkali metal phosphate furnace product, continuously tumbling the body of furnace product, continuously distributing alkali metal sulfate-phosphoric acid liquor over a major portion of the surface of said body, separately introducing into the furnacing zone and distributing a mixture of carbonaceous material and alkali metal carbonate over a major portion of the surface of said body, furnacing the liquor material with carbonaceous material to produce alkali metal phosphate under conditions such as to maintain the resulting body of material in a relatively dry condition, the amount of alkali metal carbonate employed being such as to provide for conversion of lower alkali metal phosphate to the alkali metal phosphate predominating in the furnace product, and to release alkali metal and phosphate from insoluble material contained in the furnace product, and withdrawing from the furnacing zone a portion of the body of furnace product.

3. In the manufacture of alkali metal phosphate furnace product by a process involving furnacing at elevated temperatures alkali metal sulfate containing material, phosphate radical containing material and carbonaceous material, the steps comprising continuously maintaining in a reaction zone a body comprising alkali metal phosphate furnace product, maintaining elevated furnacing temperatures in said zone, agitating said body to expose relatively fresh portions thereof, dispersing phosphate radical containing material and dispersing alkali metal sulfate material, in proportions reacting to form alkali metal phosphate, onto said exposed portions of said body, and furnacing said materials at the elevated furnacing temperatures and in the presence of carbonaceous material and alkali metal carbonate material in quantities to effect production of crude alkali metal phosphate furnace product having an alkali metal to phosphate ratio of at least about three to one.

4. In the manufacture of alkali metal phosphate furnace product by a process involving furnacing at elevated temperatures alkali metal sulfate containing material, phosphate radical containing material and carbonaceous material, the steps comprising continuously maintaining in a reaction zone a body comprising alkali metal phosphate furnace product, maintaining elevated furnacing temperatures in said zone, tumbling said body of furnace product, dispersing phosphate radical containing material and dispersing alkali metal sulfate material, in proportions reacting to form alkali metal phosphate, over a substantial portion of the furnace of said body, and furnacing said materials at the elevated furnacing temperatures and in the presence of carbonaceous material and alkali metal carbonate material in quantities to effect production of crude alkali metal phosphate furnace product having an alkali metal to phosphate ratio of at least about three to one.

5. In the manufacture of alkali metal phosphate furnace product by a process involving furnacing at elevated temperatures alkali metal sulfate containing material, phosphate radical containing material and carbonaceous material, the steps comprising continuously maintaining in a reaction zone a body comprising alkali metal phosphate furnace product, maintaining elevated furnacing temperatures in said zone, continuously agitating said body to expose relatively fresh portions thereof, continuously dispersing phosphate radical containing material and continuously dispersing alkali metal sulfate material, in proportions reacting to form alkali metal phosphate, onto said exposed portions of said body, furnacing said materials at the elevated furnacing temperatures and in the presence of carbonaceous material and alkali metal carbonate material in quantities to effect production of crude alkali metal phosphate furnace product having an alkali metal to phosphate ratio of at least about three to one, and withdrawing furnace product from said zone during the course of the reaction.

6. In the manufacture of alkali metal phosphate furnace product by a process involving furnacing at elevated temperatures alkali metal sulfate containing material, phosphate radical containing material and carbonacenous material, the steps comprising continuously maintaining in a reaction zone a body comprising alkali metal phosphate furnace product, maintaining elevated furnacing temperatures in said zone, exposing relatively fresh portions of said body, dispersing phosphate radical containing material and dispersing alkali metal sulfate material, in proportions reacting to form alkali metal phosphate, onto the freshly exposed portions of said body, and furnacing said materials at the elevated furnacing temperatures and in the presence of carbonaceous material and alkali metal carbonate material in quantities to effect production of crude alkali metal phosphate furnace product having an alkali metal to phosphate ratio of at least about three to one.

7. In the manufacture of alkali metal phosphate furnace product by a process involving furnacing at elevated temperatures alkali metal sulfate containing material, phosphoric acid containing material and carbonaceous material, the steps comprising continuously maintaining in a reaction zone a body comprising alkali metal phosphate furnace product, maintaining elevated furnacing temperatures in said zone, exposing relatively fresh portions of said body, dispersing phosphoric acid containing material and dispersing alkali metal sulfate material, in proportions reacting to form alkali metal phosphate, onto said exposed portions of said body, and furnacing said materials at the elevated furnacing temperatures and in the presence of carbonaceous material and alkali metal carbonate material in quantities to effect production of crude alkali metal phosphate furnace product having an alkali metal to phosphate ratio of at least about three to one.

8. In the manufacture of akali metal phosphate furnace product by a process involving furnacing at elevated temperatures alkali metal sulfate containing material, phosphate radical containing material and carbonaceous material, the steps comprising continuously maintaining in a reaction zone a body comprising alkali metal phosphate furnace product, maintaining elevated furnacing temperatures in said zone, agitating said body to expose relatively fresh portions thereof, dispersing phosphate radical containing material and dispersing alkali metal sulfate material, in proportions reacting to form alkali metal phosphate, onto said exposed portions of said body, and furnacing said materials at the elevated furnacing temperatures and in the presence of carbonaceous material and alkali metal carbonate material in quantities to effect production of crude alkali metal phosphate furnace product having an alkali metal to phosphate ratio greater than three to one.

9. In the manufacture of alkali metal phosphate furnace product by a process involving furnacing at elevated temperatures alkali metal sulfate containing material, phosphate radical containing material and carbonaceous material, the steps comprising continuously maintaining in a reaction zone a body comprising alkali metal phosphate furnace product, maintaining elevated furnacing temperatures in said zone, agitating said body to expose relatively fresh portions thereof, continuously dispersing phosphate radical containing material and continuously dispersing alkali metal sulfate material, in proportions reacting to form alkali metal phosphate, onto said exposed portions of said body, introducing into the reaction zone a mixture containing carbonaceous material and alkali metal carbonate material in quantities to effect production of an ultimate crude alkali metal phosphate furnace product having an alkali metal to phosphate ratio of at least about three to one, and furnacing said materials at the elevated furnacing temperatures to effect production of said ultimate furnace product.

10. In the manufacture of alkali metal phosphate furnace product by a process involving furnacing at elevated temperatures alkali metal sulfate containing material, phosphoric acid containing material and carbonaceous material, the steps comprising continuously maintaining in a reaction zone a body comprising alkali metal phosphate furnace product, maintaining elevated furnacing temperatures in said zone, tumbling said body of furnace product, continuously dispersing phosphate radical containing material and continuously dispersing alkali metal sulfate material, in proportions reacting to form alkali metal phosphate, over a substantial portion of the surface of said body, introducing into said zone a mixture containing carbonaceous material and alkali metal carbonate material in quantities to effect production of an ultimate crude alkali metal phosphate furnace product having an alkali metal to phosphate ratio of at least about three to one, furnacing said materials at the elevated furnacing temperatures to effect production of said ultimate furnace product, and 11. In the manufacture of alkali metal phosphate furnace product by a process involving furnacing at elevated temperatures alkali metal sulfate containing material, phosphate radical containing material and carbonaceous material, the steps comprising forming a liquor containing alkali metal sulfate material and phosphate radical containing material in proportions reacting to form alkali metal phosphate, continuously maintaining a body comprising alkali metal furnace product in a reaction zone, maintaining elevated furnacing temperatures in said zone, exposing relatively fresh portions of said body, dispersing said liquor onto the freshly exposed portions of said body, and furnacing said materials at the elevated furnacing temperatures and in the presence of carbonaceous material and alkali metal carbonate material in quantities to effect production of crude alkali metal phosphate furnace product having an alkali metal to phosphate ratio of at least about three to one.

12. In the manufacture of alkali metal phosphate furnace product by a process involving furnacing at elevated temperatures alkali metal sulfate containing material, phosphate radical containing material and carbonaceous material, the steps comprising forming a liquor containing alkali metal sulfate material and phosphate radical containing material in proportions reacting to form alkali metal phosphate, continuously maintaining a body comprising alkali metal furnace product in a reaction zone, maintaining elevated furnacing temperatures in said zone, continuously agitating said body to expose relatively fresh portions thereof, continuously dispersing said liquor onto said exposed portions of said body, furnacing said materials at the elevated furnacing temperatures and in the presence of carbonaceous material and alkali metal carbonate material in quantities to effect production of crude alkali metal phosphate furnace product having an alkali metal to phosphate ratio of at least about three to one, and withdrawing furnace product from said zone during the course of the reaction.

13. In the manufacture of alkali metal phosphate furnace product by a process involving furnacing at elevated temperatures alkali metal sulfate containing material, phosphoric acid containing material and carbonaceous material, the steps comprising forming a liquor containing alkali metal sulfate material and phosphoric acid containing material in proportions reacting to form alkali metal phosphate, continuously maintaining a body comprising alkali metal furnace product in a reaction zone, maintaining elevated furnacing temperatures in said zone, tumbling said body of furnace product, continuously dispersing said liquor over a substantial portion of the surface of said body, furnacing said materials at the elevated furnacing temperatures and in the presence of carbonaceous material and alkali metal carbonate material in quantities to effect production of crude alkali metal phosphate furnace product having an alkali metal to phosphate ratio of at least about three to one, and withdrawing furnace product from said zone during the course of the reaction.

14. In the manufacture of alkali metal phosphate furnace product by a process involving furnacing at elevated temperatures alkali metal sulfate containing material, phosphate radical containing material and carbonaceous material, the steps comprising forming a liquor containing alkali metal sulfate material and phosphate radical containing material in proportions reacting to form alkali metal phosphate, continuously maintaining a body comprising alkali metal furnace product in a reaction zone, maintaining elevated furnacing temperatures in said zone, agitating said body to expose relatively fresh portions thereof, dispersing said liquor onto said exposed portions of said body, and furnacing said materials at the elevated furnacing temperatures and in the presence of carbonaceous material and alkali metal carbonate material in quantities to effect production of crude alkali metal phosphate furnace product having an alkali metal to phosphate ratio greater than three to one.

15. In the manufacture of alkali metal phosphate furnace product by a process involving furnacing at elevated temperatures alkali metal sulfate containing material, phosphate radical containing material and carbonaceous material, the steps comprising forming a liquor containing alkali metal sulfate material and phosphate radical containing material in proportions reacting to form alkali metal phosphate, continuously maintaining a body comprising alkali metal furnace product in a reaction zone, maintaining elevated furnacing temperatures in said zone, agitating said body to expose relatively fresh portions thereof, continuously dispersing said liquor onto said exposed portions of said body, introducing into the reaction zone a mixture containing carbonaceous material and alkali metal carbonate material in quantities to effect production of an ultimate crude alkali metal phosphate furnace product having an alkali metal to phosphate ratio of at least about three to one, and furnacing said materials at the elevated furnacing temperatures to effect production of said ultimate furnace product.

16. In the manufacture of alkali metal phosphate furnace product by a process involving furnacing at elevated temperatures alkali metal sulfate containing material, phosphoric acid containing material and carbonaceous material, the steps comprising forming a liquor containing alkali metal sulfate material and phosphate radical containing material in proportions reacting to form alkali metal phosphate, continuously maintaining a body comprising alkali metal furnace product in a reaction zone, maintaining elevated furnacing temperatures in said zone, tumbling said body of furnace product, continuously dispersing said liquor over a substantial portion of the surface of said body, introducing into said zone a mixture containing carbonaceous material and alkali metal carbonate material in quantities to effect production of an ultimate crude alkali metal phosphate furnace product having an alkali metal to phosphate ratio of at least about three to one, furnacing said materials at the elevated furnacing temperatures to effect production of said ultimate furnace product, and withdrawing furnace product from said zone during the course of the reaction.

LOUIS PREISMAN.